(12) United States Patent
Ismert

(10) Patent No.: US 6,446,915 B1
(45) Date of Patent: *Sep. 10, 2002

(54) PLUMBING SLIDER BRACKET AND DOUBLE RATCHET ARM PIPE CLAMP ASSEMBLY

(75) Inventor: Joseph P. Ismert, Kansas City, MO (US)

(73) Assignee: Sioux Chief Manufacturing Co., Inc., Peculiar, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/356,640

(22) Filed: Jul. 19, 1999

Related U.S. Application Data

(63) Continuation-in-part of application No. 08/965,302, filed on Nov. 6, 1997.

(51) Int. Cl.$^7$ .................................................. F16L 3/08
(52) U.S. Cl. .................. 248/68.1; 248/68.1; 248/74.1; 248/74.4; 24/271
(58) Field of Search ........................... 248/68.1, 65, 69, 248/73, 49, 57, 74.1, 200.1, 298.1, 220.21, 292.12, 74.4, 236.5, 231.61, 316.6, 74.3; 24/271, 525, 129.9, 135 R

(56) References Cited

U.S. PATENT DOCUMENTS

| | | |
|---|---|---|
| 2,904,294 A | 9/1959 | Marygold |
| 2,931,607 A | 4/1960 | McFarland |
| 3,163,386 A | 12/1964 | Collins |
| 3,226,069 A * | 12/1965 | Clarke .......................... 248/73 |
| 3,718,307 A | 2/1973 | Albanese |
| 3,848,840 A | 11/1974 | Umerzu |
| 4,076,199 A | 2/1978 | Paulsen |
| 4,244,083 A | 1/1981 | Aremka |
| 4,395,009 A | 7/1983 | Bromke |
| 4,717,101 A | 1/1988 | Harrod |
| 4,768,741 A | 9/1988 | Logsdon |
| 5,149,026 A | 9/1992 | Allen |
| 5,150,865 A | 9/1992 | Miller |
| 5,855,342 A * | 1/1999 | Hawkins et al. ............ 248/68.1 |
| 5,992,802 A * | 11/1999 | Campbell ................... 248/68.1 |
| 6,126,122 A * | 10/2000 | Ismert ........................ 248/74.1 |

OTHER PUBLICATIONS

Sioux Chief Manufacturing Company, Inc.'s Catalog #898, p. 9 "SLIDER™", SLIDER Plumbing, HVAC & Conduit Brackets shown therein were on sale more than one year prior to the filing date of the present application.

* cited by examiner

Primary Examiner—Kimberly Y T. Wood

(57) ABSTRACT

A plumbing slider bracket and double ratchet arm pipe clamp includes a slider bracket with a first bracket section which is telescopically received within a second bracket section such that it is slidable back and forth within the second bracket section to make an extendable slider bracket. Flexible tabs extending from either end of the slider bracket allow attachment of the bracket to an outer stud surface, or within the stud spacing in any desired orientation. Each double ratchet arm pipe clamp is received by the slider bracket and is movable along the length of the slider bracket until a pipe is clamped therein. The clamping action both secures the pipe in place within the clamp, and also forces a resilient insert downward against the bottom wall of the slider bracket to anchor the clamp in position within the slider bracket.

23 Claims, 3 Drawing Sheets

PLUMBING SLIDER BRACKET AND DOUBLE RATCHET ARM PIPE CLAMP ASSEMBLY

CROSS REFERENCE TO RELATED APPLICATIONS

This application is a continuation-in-part of application Ser. No. 08/965,302, entitled Double Ratchet Arm Pipe Clamp, which was filed on Nov. 6, 1997.

FIELD OF THE INVENTION

The present invention relates to a slider bracket and clamp system for plumbing support, and, more particularly, to such a slider bracket in which a first and a second U-shaped bracket section are shaped to allow the first bracket section to be telescopically received in the second bracket section such that it can slide back and forth within the second bracket section to collectively make a single, length adjustable, slider bracket. A flexible tab is provided on the exposed end of each of the first and second bracket sections. A special ratchet operated pipe clamp assembly has a base which is shaped to be received and retained in either the first or the second bracket section and the clamp assembly is designed such that, when a pipe is secured in place within the clamp assembly, a resilient insert within the clamp base is forced into contact with a bottom wall of the slider bracket to anchor the clamp, and the secured pipe, stationary with respect to the slider bracket.

BACKGROUND OF THE INVENTION

Manufacturers of plumbing supplies are constantly seeking to improve the convenience and efficiency of their products for the tradesman. Brackets and plumbing supports are increasingly designed for ease of installation and for universal application. An early example of an adjustable bracket is illustrated and described in U.S. Pat. No. 3,163,386, entitled Adjustable Duct Hanger. In this patent, an "outer" and an "inner rectilinear member" are engaged with each other such that they can be telescopically extended and retracted relative to each other. A prong is attached to the terminal end of each of the telescoping members such that the bracket can be telescopically extended to the full width of an adjacent pair of joists where a duct is to be supported and the prongs driven into the sides of the joists to hold the bracket, and the duct, in place. While the '386 patent discusses duct support, it can also be used for plumbing support as well.

An example of a plumbing bracket which is designed for easy installation in a variety of different environments is found in U.S. Pat. No. 5,060,892 to Glen Dougherty, entitled Plumbing Hanger Bracket Assembly. The Dougherty bracket is a slider bracket in which a first bracket section is received within a second, slightly larger bracket section such that the first bracket section can be telescopically extended and retracted relative to the second section to adjust the overall length of the bracket. The bracket has a plurality of spaced openings in the rear of the bracket and a plastic pipe support sleeve is received within the combined bracket sections such that, when the sleeve is aligned with one of the openings in the bracket a plumbing pipe can extend straight through the sleeve and bracket to be supported thereby. The Dougherty bracket is designed primarily for installation of hot and cold water supply pipes behind plumbing installations such as tub and shower or lavatory supplies. However, brackets such as Dougherty's are very limited in their application. They are capable only of supporting pipes extending from front to back through the bracket, and the support sleeves do not lock into place, but are slidable within the bracket, i.e. they are held in position only by the pipes themselves. Placement of supported pipes is also limited by the placement of the bracket openings.

It is clear that a need exists for a slider bracket which is length adjustable to allow installation in a variety of plumbing support applications between wall studs, floor and ceiling joists, and other building members and to allow for installation either inside or outside of the building component pairs. Such a slider bracket should allow pipes to be supported in any orientation relative to the opening in which it is positioned and should accommodate specialized pipe clamp assemblies which can be secured into a stable position along the length of the bracket.

SUMMARY OF THE INVENTION

The present invention is directed to a plumbing slider bracket and clamp assembly for securing plumbing pipes in fixed positions within spaces defined by adjacent wall studs, joists and other building or bracketing members. The slider bracket includes first and second bracket sections which are U-shaped in cross section, each of which has opposing depending extensions and depending ridges extending into the U shaped channel. The first bracket section is slightly smaller in dimension that the second bracket section which allows the first bracket section to be telescopically received within the second bracket section such that it is slidable back and forth within the second bracket section to collectively make a single, length adjustable slider bracket. A respective flexible tab is provided on the rear walls of each of the first and second bracket sections with the tabs extending in opposing directions and being foldable between an extended position which allows the bracket to be installed on the outside of a pair of stud or joists, i.e. the tabs can be attached to the outer stud surface, or bent inward at a 90 degree angle relative to the bracket which allows the bracket to be installed within the stud spacing in any desired orientation, i.e. the tabs are attached to the inward facing stud or joist surface.

Specialized double ratchet arm pipe clamp assemblies for use in the slider bracket are of a three part construction with a base member, a resilient insert and a keeper block engageable with the resilient insert within the base member to clamp a pipe therebetween. Each base member has a rectangular base frame with two pair of opposing gripping steps formed in it at different levels such that it can be received and retained in either the first or the second, or both slider bracket sections. Each base member has a pair of elongate ratchet arms extending outward from the base frame. Each ratchet arm has a plurality of ratchet teeth formed along an outside surface. Each keeper block has a pair of ratchet arm receiving apertures formed there through near respective opposite ends thereof, with each arm receiving aperture having an anvil surface. A respective pawl member is positioned within each aperture with each pawl member being resiliently urged toward the anvil surface of the respective aperture. The keeper block is received on the clamp base member with each ratchet arm extending through a respective arm receiving aperture. The ratchet teeth on each ratchet arm engage the respective pawl member in the aperture through which the arm extends. Each pawl member includes an extension which protrudes outward from the keeper block which, if pushed outward, disengages the pawl member from the ratchet teeth to thereby release the ratchet arm.

The resilient insert is designed to accomplish two functions, i.e. it forms a V shaped resilient upper surface which combines with the keeper block to clamp a pipe in place and, as the keeper block is cinched down against the pipe, the clamped pipe exerts a force against the resilient upper surface, which forces it downward to engage the bottom wall of the slider bracket, thus firmly anchoring the clamp assembly in place within the slider bracket.

OBJECTS AND ADVANTAGES OF THE INVENTION

The principal objects of the present invention include: providing a plumbing slider bracket and double ratchet arm pipe clamp assembly; providing such a plumbing slider bracket and double ratchet arm pipe clamp assembly which can be telescopically extended to fit between studs, joists, or other building members spaced at varying widths; providing such a plumbing slider bracket and double ratchet arm pipe clamp assembly in which the slider includes a first bracket section telescopically received within a second bracket section; providing such a plumbing slider bracket and double ratchet arm pipe clamp assembly in which a number of the double ratchet arm clamp assemblies can be securely fitted into a single slider bracket, either in a portion of the slider bracket where the first and second bracket sections overlap, or in a portion where they do not overlap; providing such a plumbing slider bracket and double ratchet arm pipe clamp assembly in which each double ratchet arm pipe clamp assembly includes a resilient insert which provides a cushioned clamping surface for securing a pipe in position within the clamp assembly and which also pushes downward against the bottom wall of the slider bracket in response to clamping forces applied to the pipe which causes the pipe clamp assembly to be anchored in position within the slider bracket; providing such a plumbing slider bracket and double ratchet arm pipe clamp assembly which is universally useful to hold plumbing pipes in place within a structure regardless of their configuration, spacing and routing; and providing such a plumbing slider bracket and double ratchet arm pipe clamp assembly which is effective yet economical and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
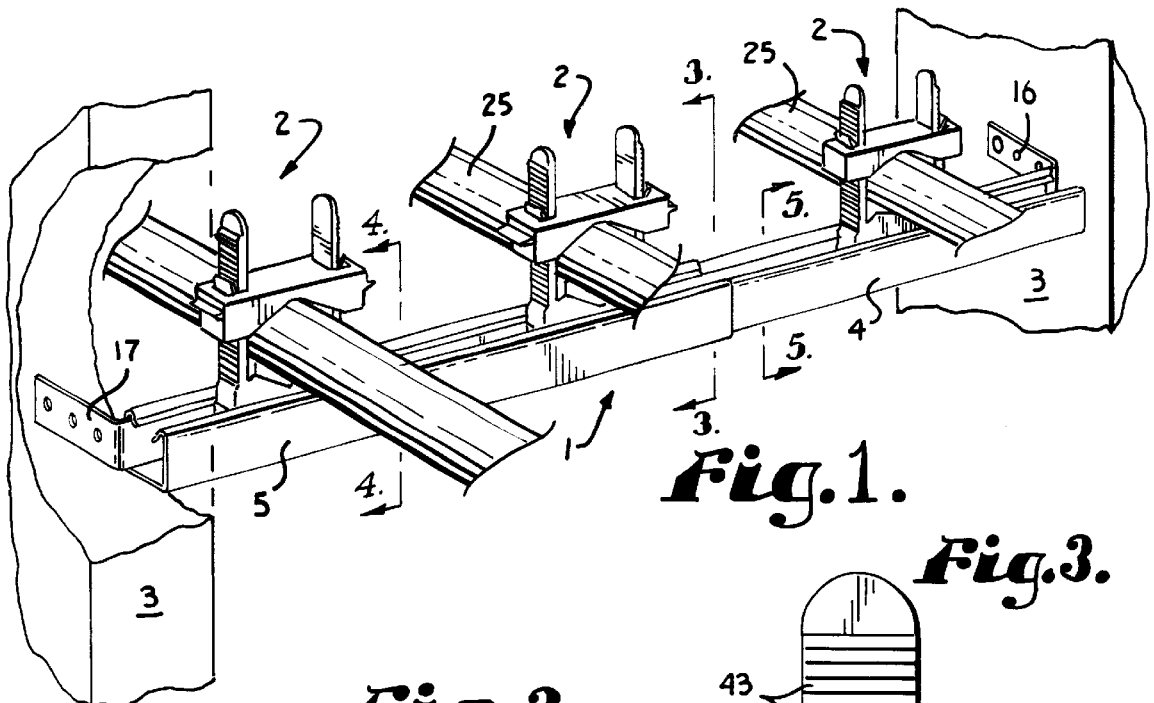
FIG. 1 is a perspective view of a plumbing slider bracket secured in position between a pair of wall studs with three double ratchet arm pipe clamp assemblies respectively securing three pipes in position, as for a tub and shower stub out.
Figure 7:
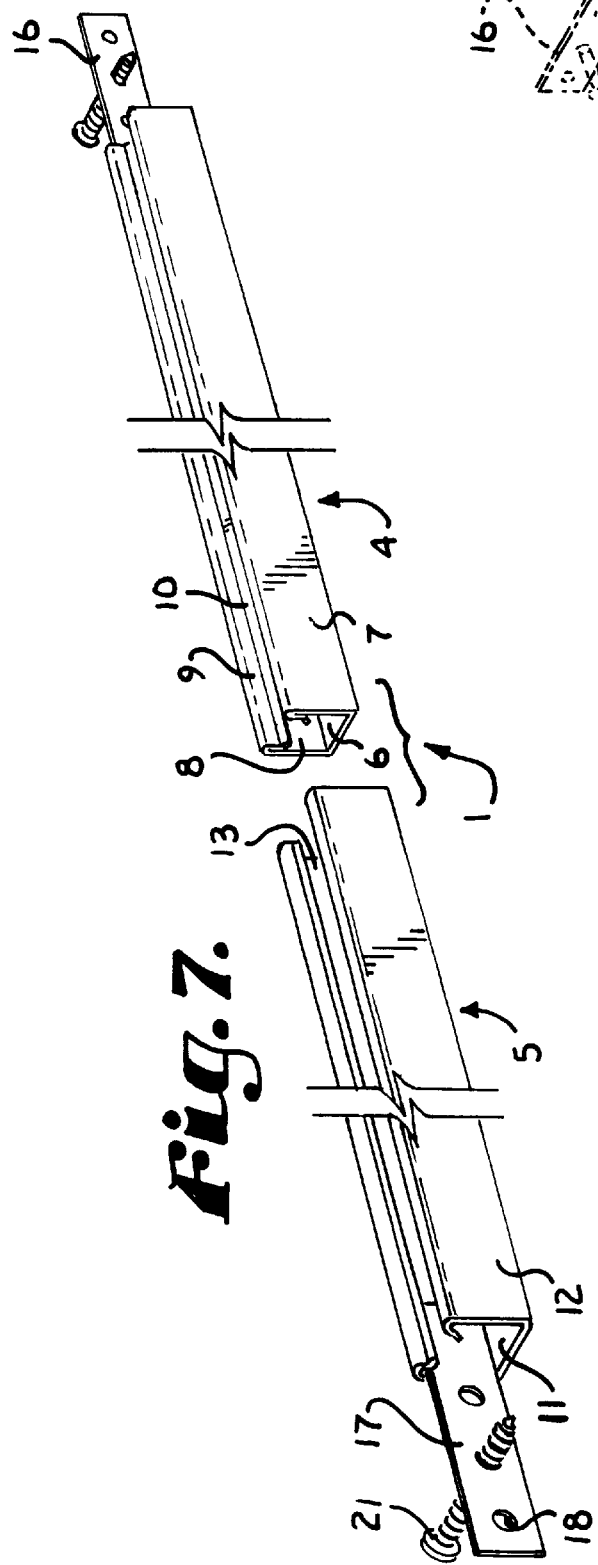
FIG. 7 is an exploded view of the inventive slider bracket.
Figure 8:
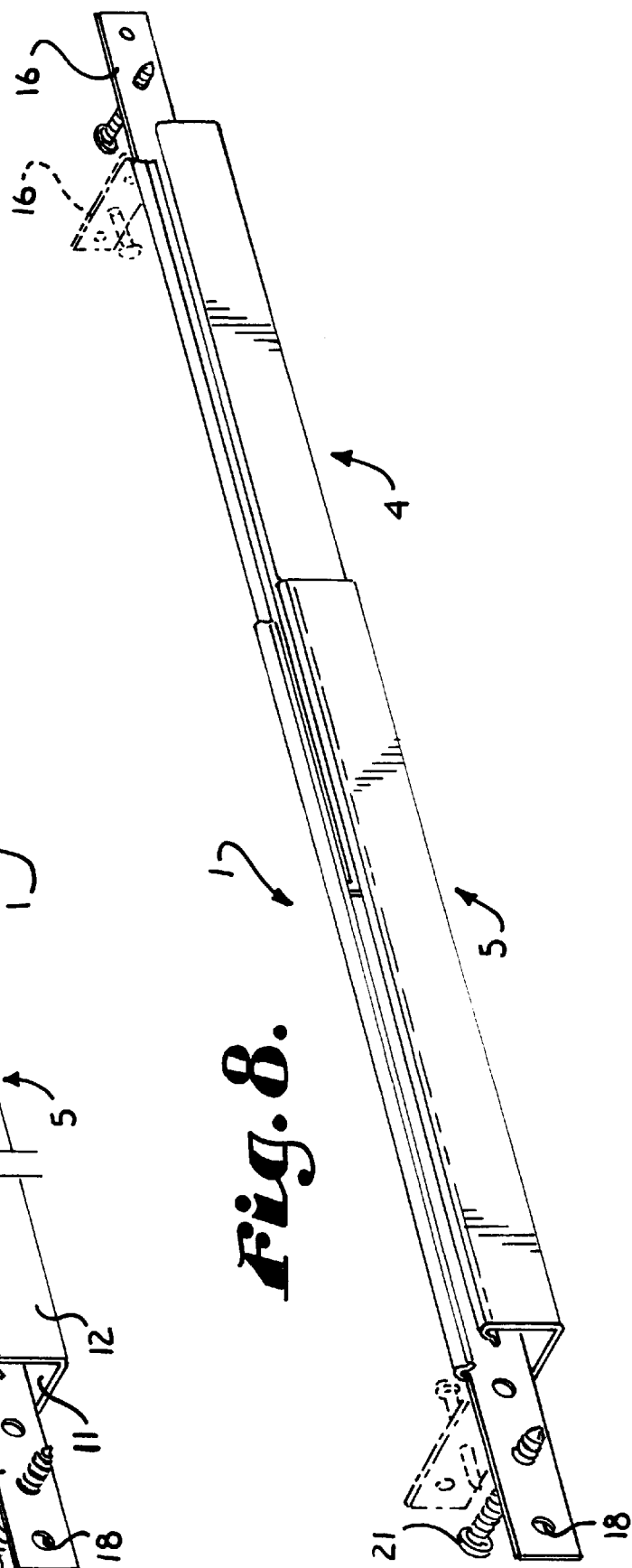
FIG. 8 is an assembled view of the slider bracket of FIG. 7.

Referring to FIGS. 1, 7 and 8, an inventive plumbing slider bracket 1 with three double ratchet arm pipe clamp assemblies 2 is illustrated as being installed between two wall studs 3. The slider bracket 1 includes a first bracket section 4 and a second bracket section 5 which are each substantially U-shaped in cross section with the first bracket section 4 being slightly smaller in dimension that the second bracket section 5, which allows the first bracket section 4 to be telescopically received within the second bracket section 5.

The first bracket section 4 has a bottom wall 6 connecting a front wall 7 to a rear wall 8. Each of the front and rear walls 7 and 8 have a respective wall extension 9 which is bent back on the respective front or rear wall 7 or 8 at approximately 180 degrees. Each wall extension 9 includes a depending ridge 10 which extends along the length of the first bracket section 4 and extends inward from the wall extensions 9 into the channel formed by the front and rear walls 7 and 8 and the bottom wall 6. The ridges 10 thus present opposing gripping surfaces within the first bracket section 4 for retention of the pipe clamp assemblies 2, as will be fully explained below.

Similarly, the second bracket section 5 also has a bottom wall 11 connecting a front wall 12 to a rear wall 13. Each of the front and rear walls 12 and 13 has a respective wall extension 14 which is bent back on the respective front or rear wall 12 or 13 at approximately 180 degrees. Each wall extension 14 includes a depending ridge 15 which extends along the length of the second bracket section 5 and extends inward from the wall extensions 14 into the channel formed by the front and rear walls 12 and 13 and the bottom wall 11. The ridges 15 thus also present opposing gripping surfaces within the second bracket section 5 for retention of the pipe clamp assemblies 2, as explained below. A preferred angle for both the ridges 10 and 15 is approximately 20 degrees from vertical.

The slider bracket 1 also includes a flexible tab 16 which is attached to and extends outward from the rear wall 8 of the first bracket section 4 and a matching, flexible tab 17, attached to and extending outward from the rear wall 13 of the first bracket section 5 in a direction opposite to the tab 16. The tabs 16 and 17 preferably include a number of pre-drilled holes 18 which accommodate fasteners, such as screws 21 (FIGS. 7 and 8). The screws 21 can be factory "pre-loaded" into the holes 18 in the tabs 16 and 17 for ease of use by plumbers in the field. The tabs 16 and 17 are flexible enough that they can be easily bent to a 90 degree angle to allow the slider bracket 1 to be attached to the inward facing surface of two adjacent building members, such as within a wall between the studs 3, as shown in FIG. 1. Alternatively, the tabs 16 and 17 can be left in the extended position of FIGS. 7 and 8 to allow the slider bracket 1 to be installed on the outside surface of a single or an adjacent pair of studs, joists, etc.

Figure 2:
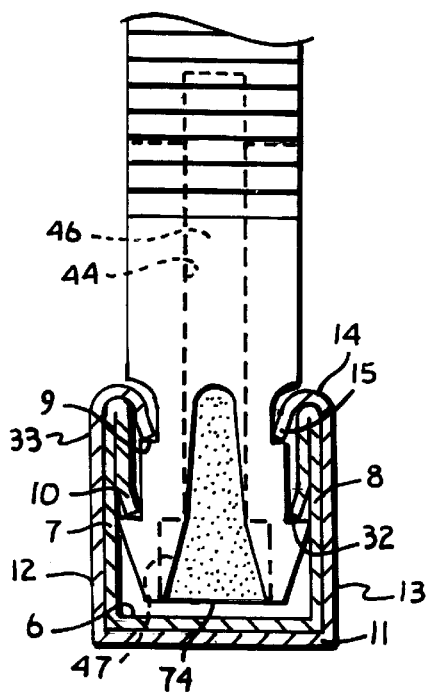
FIG. 2 is a greatly enlarged, fragmentary, cross sectional view of the plumbing slider bracket and double ratchet arm pipe clamp assembly of FIG. 1, taken along line 3—3 of FIG. 1, but with no pipe clamped in position within a clamp assembly, and thus with the resilient insert undistorted.
Figure 4:
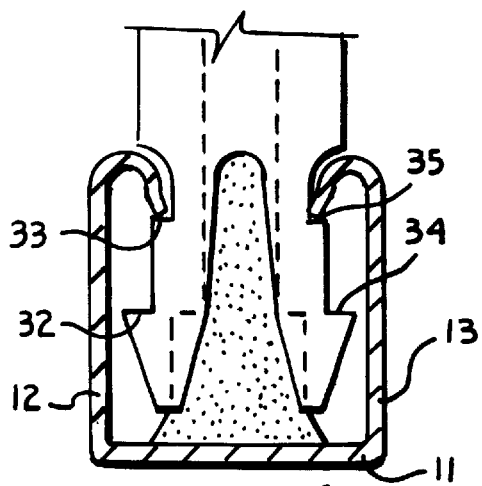
FIG. 4 is a greatly enlarged, fragmentary, cross sectional view of the plumbing slider bracket and double ratchet arm pipe clamp assembly of FIG. 1, taken along line 4—4 of FIG. 1, showing a pipe clamp assembly being retained by just the second (outer) slider section.
Figure 5:
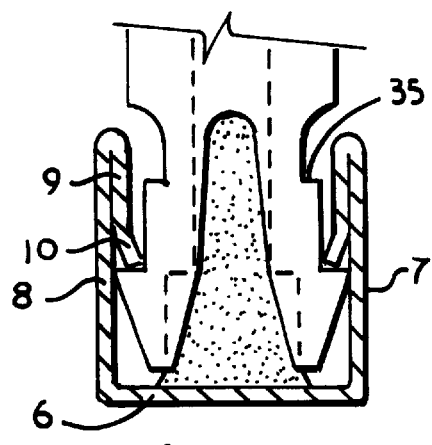
FIG. 5 is a greatly enlarged, fragmentary, cross sectional view of the plumbing slider bracket and double ratchet arm pipe clamp assembly of FIG. 1, taken along line 5—5 of FIG. 1, showing a pipe clamp assembly being retained by just the first (inner) slider section.
Figure 6:
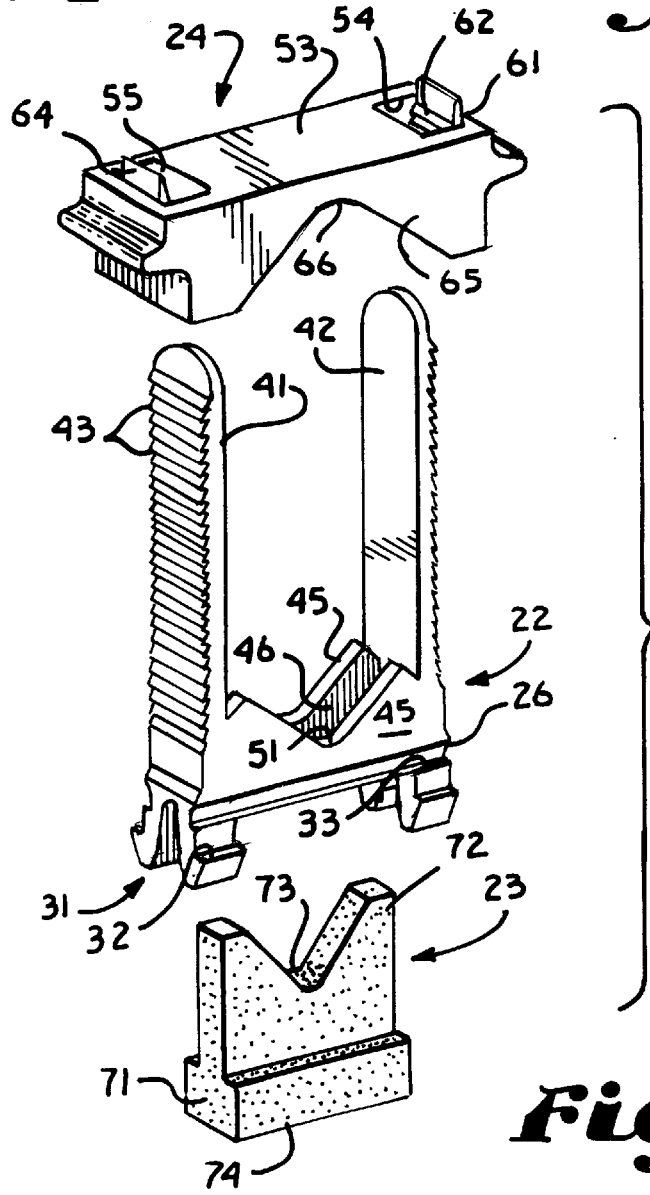
FIG. 6 is an exploded view of one of the inventive double ratchet arm pipe clamp assemblies designed for use with the slider bracket of FIGS. 7 and 8.

Each of the double ratchet arm pipe clamp assemblies 2 is of a three part construction, as shown in FIG. 6. Each clamp assembly 2 includes a base member 22, a resilient insert 23, made, for example, of molded rubber, and a keeper block 24 engageable with the resilient insert 23 and with the base member 22 to clamp a pipe 25 therebetween. Each base member 22 has a substantially rectangular base frame 26 with two pairs of depending legs 31, each with a lower gripping step 32 and an upper gripping step 33 formed therein. As best illustrated in FIG. 2, each clamp assembly 2 can be snapped into position within the slider bracket 1 or, alternatively, slid into the bracket from either open end of the channels formed in the first or second bracket sections 4 or 5. When the clamp assemblies 2 are placed into the slider bracket 1, the opposing lower gripping steps 32 engage the ridges 10 of the first bracket section 4 while the opposing upper gripping steps 33 engage the ridges 15 of the second bracket section 5. This insures that the clamp assemblies 2 will be securely held in place within the slider bracket 1 at portions of the slider bracket 1 where the first bracket section 4 overlaps the second bracket section 5, as shown in FIG. 2. In addition, the clamp assemblies 2 will be securely held in place within the slider bracket 1 at portions where the first bracket section 4 is telescoped away from the second bracket section 5 by the lower gripping steps 32, as shown in FIG. 5, and at portions where the second bracket section 5 is telescoped away from the first bracket section 4 by the upper gripping steps 33, as shown in FIG. 4, Each of the lower gripping steps 32 has a top surface 34 and each of the upper gripping steps 33 has a top surface 35, with the surfaces 34 and 35 each preferably extending outward and downward slightly at an angle of approximately 5 degrees from horizontal. The upper gripping step 33 can extend lengthwise along the entire base frame 26 to provide a more effective gripping surface. Experimentation has shown that the approximate 5 degree angles of the gripping step top surfaces 34 and the approximate 20 degree angle of the ridges 10 and 15 allow the clamp assemblies 2 to be easily snapped into position within the slider bracket 1 while making it very difficult to remove the clamp assembly 2 by pulling outward on it or twisting it.

Each pipe clamp assembly base member 22 is preferably made of molded plastic and also includes a pair of elongated ratchet arms 41 and 42 extending outward from the base frame 26. Each ratchet arm 41 and 42 has a plurality of ratchet teeth 43 formed along an outside surface thereof. The clamp base frame 26 includes a central, generally T shaped central aperture 44 and a pair of upstanding walls 45 positioned on respective sides of an upper portion 46 of the central aperture 44 which walls 45 each include a V shaped notch 51 for cradling a pipe, such as the pipes 25 of FIGS. 1 and 3. The central aperture 44 also includes a lower portion 47 which is larger in cross sectional area than the upper portion 46.

Figure 3:
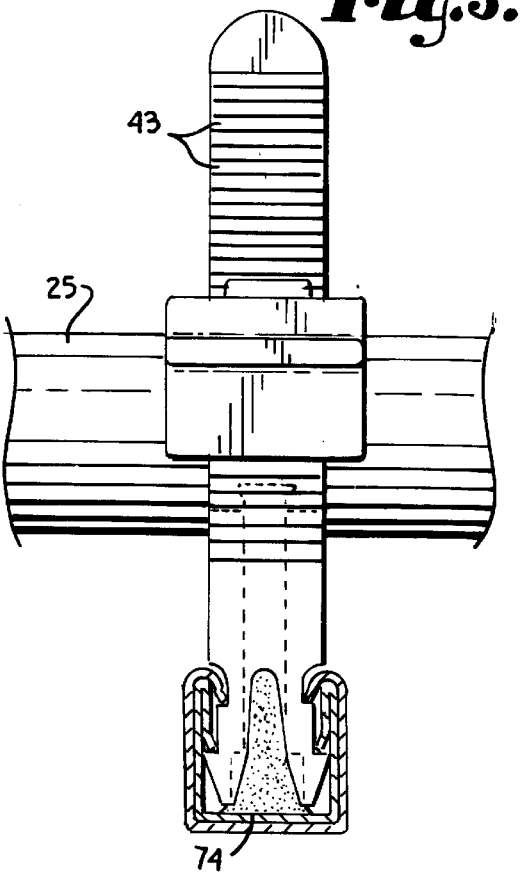
FIG. 3 is an enlarged, cross sectional view of the plumbing slider bracket and double ratchet arm pipe clamp assembly of FIG. 1, taken along line 3—3 of FIG. 1, but with a pipe secured in a pipe clamp assembly and the resilient insert distorted thereby into contact with the bottom wall of the slider bracket.

Each clamp keeper block 24 includes a keeper block plate 53 with a pair of arm receiving apertures 54 formed there through near respective opposite ends thereof and sized to receive respective ones of the ratchet arms 41 and 42, as shown in FIGS. 1, 3 and 6. Each of the arm receiving apertures 54 has an inner anvil surface 55 and a respective pawl member 61 is positioned within and hingedly attached to an outside wall of each aperture 54 with each pawl member 61 including a series of teeth 62 spaced to engage the corresponding ratchet teeth 43 on the respective ratchet arm 41 or 42 extending through the aperture 54. Each pawl member 61 is molded in a manner such that is resiliently urged toward the anvil surface 55 of the respective aperture 54 so that the ratchet arm teeth 43 are captured by the teeth 62 on the pawl member 61. Each pawl member 61 includes an extension 64 which protrudes outward from the keeper block plate 53. The extensions 64, when pushed outward, disengage the pawl member teeth 62 from the ratchet teeth 43 to thereby release the ratchet arms 41 and 42.

The keeper block 52 also includes a pair of keeper block walls 65 positioned along respective sides of the keeper block plate 53 with each keeper block wall 65 also including a V shaped notch 66. When the keeper block 52 is ratcheted downward along the ratchet arms 41 and 42, the V shaped notches 66 on the keeper block 52 are positioned in opposition to the V shaped notches 51 on the base member 22 to cradle the pipe 25 therebetween.

The resilient insert 23 of each clamp assembly 2 includes a base portion 71 with a first footprint which allows it to be received within the lower portion 47 of the base member central aperture 44. The resilient insert 23 also includes an elongate upper portion 72 extending upward from the base portion 72 and the upper portion 72 has a second, smaller footprint which allows it to be received within the upper portion 46 of the base member central aperture 44.

The upper portion 72 of the resilient insert 23 is also shaped as a V notch 73 with a shape that matches, but extends slightly above the V notches 51 of the base member 22. The V notch 73 of the resilient insert 23 forms a resilient receiving surface which receives a pipe 25, and is forced downward within the base member central aperture 44 as the keeper block 52 is ratcheted downward on the base member ratchet arms 41 and 42. This downward movement of the resilient insert 23 forces a bottom surface 74 of the base portion 72 to come into contact with the bottom wall 6 of the first bracket section 4 and to spread outward along that bottom wall 6. Also, as shown in FIG. 4, in portions of the slider bracket 1 where the second bracket section 5 is telescoped beyond that of the first bracket section 4, the bottom surface 74 will be forced downward into contact with the bottom wall 11 of the second bracket section 5. This causes the clamp assemblies 2 to be anchored in a set position along the slider bracket 1 since the distorted base portion 72 forces the clamp upward so that the gripping steps 32 and 33 into contact with the respective ridges 10 and 15, thus forming a spring action which wedges the clamp assemblies 2 into place.

While the plumbing slider bracket 1 and double ratchet arm pipe clamp assemblies 2 have been described and illustrated for use with plumbing pipes, they can be equally useful with electrical or communications cables or conduits, fiber optic bundles, wire bundles, or any other elongate structure to be routed through a building structure, therefore, the terms "pipe" and "plumbing" are intended for illustrative purposes only and are not intended to be limiting. Particular details such as the generally rectangular cross sectional shape of the first and second bracket sections 4 and 5, cylindrical shape of the sleeve 1, the number and placement of the gripping steps 32 and 33, etc. are meant to be exemplary only, and can be varied considerably and still accomplish the intended results. It is thus to be understood that while certain forms of the present invention have been illustrated and described herein, it is not to be limited to the specific forms or arrangement of parts described and shown.

I claim:

1. A pipe clamp assembly, comprising:
   a) a clamp base member including:
      i) a base frame comprising
         1) a plurality of downward extending legs; and
         2) at least one gripping step formed in each said leg;
      ii) a pair of ratchet arms extending outward in substantially parallel relation from said base frame, each said ratchet arm having a plurality of ratchet teeth formed along at least one surface thereof; and
   b) a keeper block including a keeper block plate with a pair of ratchet arm receiving apertures formed there through, said arm receiving apertures being positioned and spaced such that each ratchet arm of said pair extends through a respective one of said arm receiving apertures, said keeper block also including a respective anvil surface and a hinged pawl member positioned proximate each arm receiving aperture on opposing sides thereof, each said pawl member being resiliently urged toward its opposing anvil surface so as to provide a ratchet action on the ratchet teeth along a respective one of said ratchet arms extending between the pawl member and the anvil surface as it extends through the arm receiving aperture.

2. A pipe clamp assembly as in claim 1, each of said pawl members in said keeper block comprising a plurality of pawl ratchet teeth sized and positioned to engage the ratchet teeth along the respective one of said ratchet arms extending between that pawl member and the opposing anvil surface as it extends through the arm receiving aperture.

3. A pipe clamp assembly as in claim 2, each of said pawl members further comprising a pawl extension which protrudes outward past the keeper block plate, said pawl extensions, when urged away from the opposing anvil surface, acting to disengage the pawl member ratchet teeth from the ratchet teeth along the respective one of said ratchet arms extending between that pawl member and the opposing anvil surface as it extends through the arm receiving aperture.

4. A pipe clamp assembly as in claim 1, said base member further comprising a pair of upstanding base walls extending upward from said base frame, each of the base walls in said pair including a respective V shaped notch.

5. A pipe clamp assembly as in claim 4, and further comprising;
   a) a central opening formed within said base frame; and
   b) a resilient insert sized to be received within said base frame central opening, said resilient insert extending upward between said base walls.

6. A pipe clamp assembly as in claim 5, wherein;
   a) an upper surface of said resilient insert is positioned to contact a pipe clamped between said keeper block and said base member such that the clamped pipe forces said resilient insert downward within said base frame central opening such that a lower portion of said resilient insert extends protrudes downward beyond said base frame.

7. A pipe clamp assembly as in claim 6, wherein said upper surface of said resilient insert is also shaped as a V shaped notch.

8. A pipe clamp assembly as in claim 7, said keeper block further comprises a pair of upstanding keeper walls extending outward from said keeper plate each of the keeper walls in said pair including a respective V shaped notch, the V shaped notches on said keeper block being positioned in opposition to the V shaped notches on said base walls and said resilient insert when said ratchet arms extend through said arm receiving apertures so as to collectively form an opening for receiving a pipe.

9. A combination slider bracket and pipe clamp assembly, comprising:
   a) a slider bracket comprising:
      i) an elongate first bracket section which is substantially U shaped in cross section with a first front wall, a first rear wall and a first bottom wall forming a first channel, said first front and rear walls each including a first extension which is bent inward into said first channel toward said first bottom wall;
      ii) an elongate second bracket section which is substantially U shaped in cross section with a second front wall, a second rear wall and a second bottom wall forming a second channel, said second front and rear walls each including a second extension which extends inward into said second channel and downward toward said second bottom wall, each of said second extensions including a ridge which extends inward and downward into the second channel from the second extension; wherein
      iii) said first bracket section fits within said second channel with said second extensions respectively overlapping said first front and rear walls and said first extensions of said first front and rear walls to hold said first bracket section within said second channel such that said first bracket section is telescopically extendable relative to said second bracket section; and
   b) a pipe clamp assembly, comprising:
      i) a clamp base member including a base frame comprising:
         1) a plurality of downward extending legs; and
         2) at least one gripping step formed in each said leg, each said gripping step engaging a portion of one of said first or second bracket sections to retain said clamp assembly within said slider bracket; and
      ii) a clamp keeper block adjustably engageable with said clamp base member to clamp a pipe therebetween.

10. A combination slider bracket and pipe clamp assembly as in claim 9, said pipe clamp assembly further comprising:
    a) a pair of ratchet arms extending outward in substantially parallel relation from said base frame, each said ratchet arm having a plurality of ratchet teeth formed along at least one surface thereof; and
    b) said clamp keeper block includes a keeper block plate with a pair of ratchet arm receiving apertures formed there through, said arm receiving apertures being positioned and spaced such that each ratchet arm of said pair extends through a respective one of said arm receiving apertures, said keeper block also including a respective anvil surface and a hinged pawl member positioned proximate each arm receiving aperture on opposing sides thereof, each said pawl member being resiliently urged toward its opposing anvil surface so as to provide a ratchet action on the ratchet teeth along a respective one of said ratchet arms extending between the pawl member and the anvil surface as it extends through the arm receiving aperture.

11. A combination slider bracket and pipe clamp assembly as in claim 10, each of said pawl members in said keeper block comprising a plurality of pawl ratchet teeth sized and positioned to engage the ratchet teeth along the respective one of said ratchet arms extending between that pawl member and the opposing anvil surface as it extends through the arm receiving aperture.

12. A combination slider bracket and pipe clamp assembly as in claim 11, each of said pawl members further comprising a pawl extension which protrudes outward past the keeper block plate, said pawl extensions, when urged away from the opposing anvil surface, acting to disengage the pawl member ratchet teeth from the ratchet teeth along the respective one of said ratchet arms extending between that pawl member and the opposing anvil surface as it extends through the arm receiving aperture.

13. A combination slider bracket and pipe clamp assembly as in claim 10, said base member further comprising a pair of upstanding base walls extending upward from said base frame, each of the base walls in said pair including a respective V shaped notch.

14. A combination slider bracket and pipe clamp assembly as in claim 13, and further comprising;
   a) a central opening formed within said base frame; and
   b) a resilient insert sized to be received within said base frame central opening, said resilient insert extending upward between said base walls.

15. A combination slider bracket and pipe clamp assembly as in claim 14, wherein;
   a) an upper surface of said resilient insert is positioned to contact a pipe clamped between said keeper block and said base member such that the clamped pipe forces said resilient insert downward within said base frame central opening such that a lower portion of said resilient insert extends protrudes downward beyond said base frame to engage a bottom wall of said first or second bracket sections to thereby anchor said pipe clamp assembly in place within said slider bracket.

16. A combination slider bracket and pipe clamp assembly as in claim 15, wherein said upper surface of said resilient insert is also shaped as a V shaped notch.

17. A combination slider bracket and pipe clamp assembly as in claim 16, said keeper block further comprises a pair of upstanding keeper walls extending outward from said keeper plate each of the keeper walls in said pair including a respective V shaped notch, the V shaped notches on said keeper block being positioned in opposition to the V shaped notches on said base walls and said resilient insert when said ratchet arms extend through said arm receiving apertures so as to collectively form an opening for receiving a pipe.

18. A slider bracket as in claim 9, wherein:
   a) each of said first extensions includes a respective first ridge which extends inward and downward into the first channel from the first extension;
   b) each of said second extensions includes a respective second ridge which extends inward and downward into the second channel from the second extension; and
   c) each of said legs include an upper and a lower gripping step, said upper gripping step engaging said second ridge and said lower gripping step engaging said first ridge.

19. A combination slider bracket and pipe clamp assembly as in claim 18, wherein said first ridge extends inward and downward into the first channel from the first extension at an angle of approximately 20 degrees from vertical.

20. A combination slider bracket and pipe clamp assembly as in claim 19, wherein said second ridge extends inward and downward into the second channel from the second extension at an angle of approximately 20 degrees from vertical.

21. A combination slider bracket and pipe clamp assembly as in claim 20, wherein each of said upper and lower gripping steps has a top surface which extends outward and downward at an angle of approximately 5 degrees from horizontal.

22. A combination slider bracket and pipe clamp assembly as in claim 9, and further comprising:
   a) a first flexible tab attached to and extending outward from said first rear wall, said first flexible tab being pre-drilled with at least one mounting hole; and
   b) a second flexible tab attached to and extending outward from said second rear wall in a direction opposite to said first flexible tab, said second first flexible tab also being pre-drilled with at least one mounting hole.

23. A combination slider bracket and pipe clamp assembly as in claim 22, wherein said first and second flexible tabs can be bent at an approximate 90 degree angle such that said slider bracket can be mounted between two adjacent building members by attaching said flexible tabs to respective opposing inward facing surfaces of said adjacent building members.

* * * * *